United States Patent
Guillama et al.

(10) Patent No.: US 10,878,211 B2
(45) Date of Patent: Dec. 29, 2020

(54) SYSTEM AND METHOD ENABLING LOCATION, IDENTIFICATION, AUTHENTICATION AND RANGING WITH SOCIAL NETWORKING FEATURES

(71) Applicant: The Quantum Group Inc., Lake Worth, FL (US)

(72) Inventors: Noel Guillama, Wellington, FL (US); Chester Heath, Boca Raton, FL (US)

(73) Assignees: The Quantum Group, Inc., Lake Worth, FL (US); Noel J. Guillama, Wellington, FL (US)

( * ) Notice: Subject to any disclaimer, the term of this patent is extended or adjusted under 35 U.S.C. 154(b) by 0 days.

(21) Appl. No.: 15/812,189

(22) Filed: Nov. 14, 2017

(65) Prior Publication Data

US 2018/0144167 A1 May 24, 2018

Related U.S. Application Data

(60) Provisional application No. 62/421,881, filed on Nov. 14, 2016.

(51) Int. Cl.
*G06K 7/14* (2006.01)
*G06Q 10/00* (2012.01)
*G06Q 50/00* (2012.01)

(52) U.S. Cl.
CPC ........... *G06K 7/1404* (2013.01); *G06Q 10/00* (2013.01); *G06Q 50/01* (2013.01)

(58) Field of Classification Search
CPC .. H04M 1/737; H04B 10/1143; H04B 10/116; H04B 10/11; H04B 10/66; G08C 23/04; H04W 8/005; H04W 4/21; H04W 84/18
See application file for complete search history.

(56) References Cited

U.S. PATENT DOCUMENTS

| | | | | |
|---|---|---|---|---|
| 7,668,462 B2 * | 2/2010 | Watanabe | ............ | H04B 10/807 398/106 |
| 7,734,181 B2 * | 6/2010 | Bahar | ................... | H04W 76/10 398/115 |
| 8,447,813 B2 * | 5/2013 | Redmond | ........... | H04M 1/7253 709/205 |
| 8,706,815 B2 * | 4/2014 | Redmond | ........... | H04M 1/7253 709/205 |
| 9,122,391 B2 * | 9/2015 | Lee | ........................ | G06F 3/011 |
| 9,654,222 B1 * | 5/2017 | Shatz | ................. | G06K 9/00671 |
| 2008/0247759 A1 * | 10/2008 | Bahar | .............. | H04B 10/25758 398/118 |

(Continued)

*Primary Examiner* — Christopher Stanford
(74) *Attorney, Agent, or Firm* — Nixon Peabody LLP

(57) ABSTRACT

An extensible system for intercommunication between smartphones and intelligent digital cameras that permits acquisition, identification, authentication and communication outside the cellular and networked interfaces. This concept provides a means for smartphones to intercommunicate securely and directly without network, or radio based wireless connection and to provide private visual and motion-image data communication at reasonable rates between parties outside of the cellular network. It also permits intercommunication and functional extension through intermediary devices to create interactive conversations within groups.

20 Claims, 10 Drawing Sheets

(56) References Cited

U.S. PATENT DOCUMENTS

| | | | |
|---|---|---|---|
| 2009/0279107 A1* | 11/2009 | Deliwala | A63F 13/02 |
| | | | 356/623 |
| 2012/0023171 A1* | 1/2012 | Redmond | H04M 1/7253 |
| | | | 709/205 |
| 2013/0016978 A1* | 1/2013 | Son | H04B 10/116 |
| | | | 398/118 |
| 2013/0094866 A1* | 4/2013 | Pasquero | H04M 1/22 |
| | | | 398/202 |
| 2013/0234850 A1* | 9/2013 | Lee | A61B 5/02 |
| | | | 340/539.12 |
| 2013/0324171 A1* | 12/2013 | Redmond | H04M 1/7253 |
| | | | 455/500 |
| 2015/0028746 A1* | 1/2015 | Temple | H05B 33/0863 |
| | | | 315/129 |
| 2016/0047890 A1* | 2/2016 | Ryan | G01S 5/16 |
| | | | 398/118 |
| 2017/0195044 A1* | 7/2017 | Shatz | G06K 9/00671 |
| 2018/0144167 A1* | 5/2018 | Guillama | G06Q 50/01 |
| 2018/0146501 A1* | 5/2018 | Ling | H04W 4/023 |

* cited by examiner

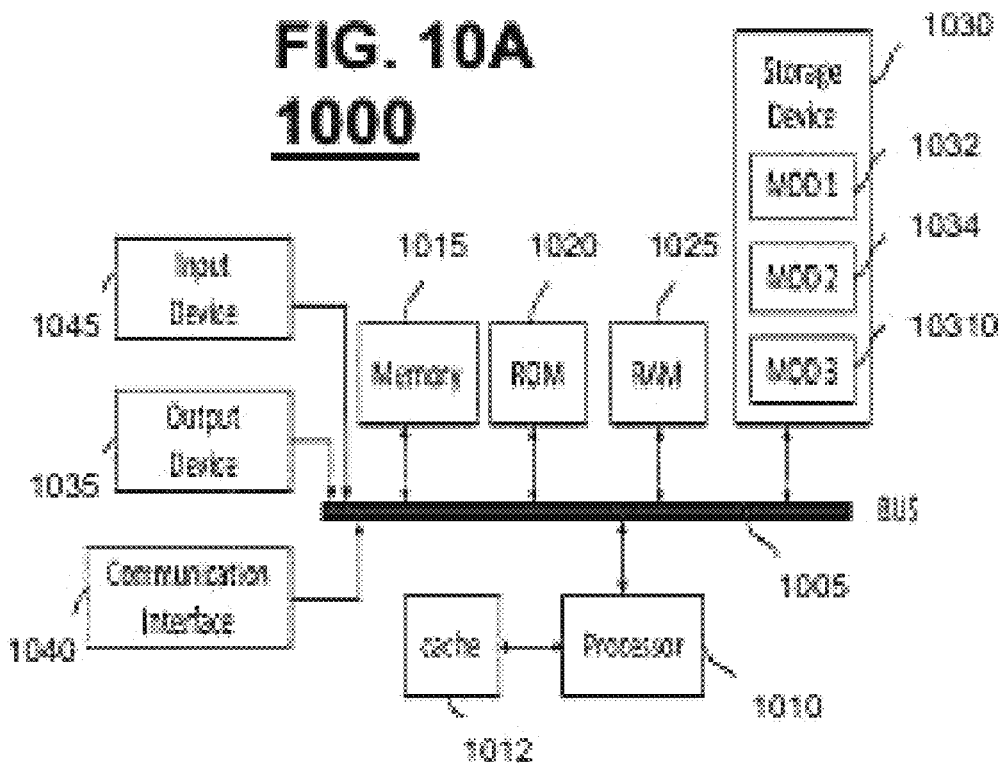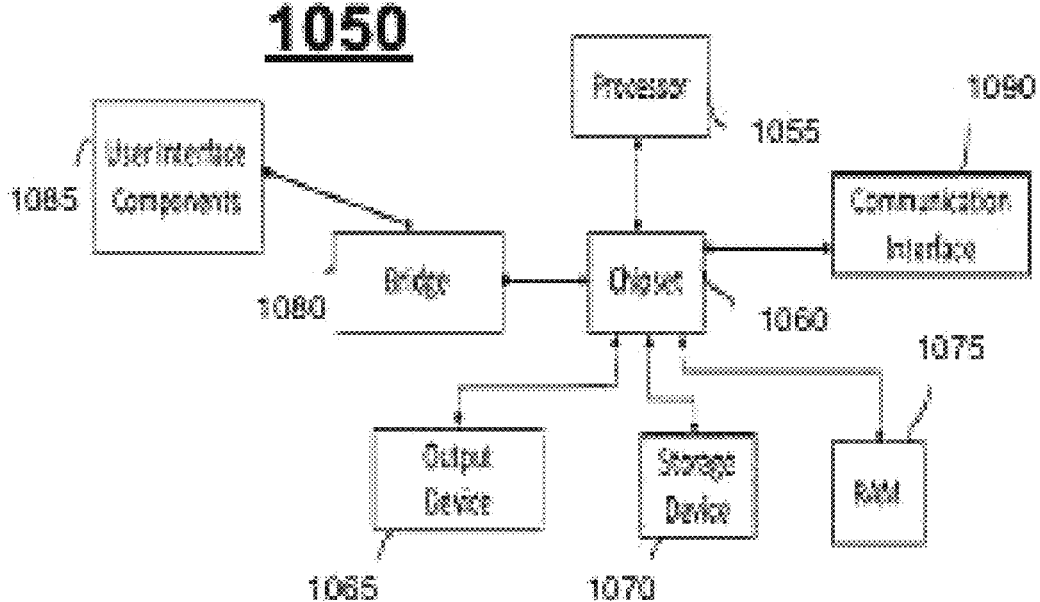

SYSTEM AND METHOD ENABLING LOCATION, IDENTIFICATION, AUTHENTICATION AND RANGING WITH SOCIAL NETWORKING FEATURES

CROSS-REFERENCE TO RELATED APPLICATIONS

This application claims priority to and the benefit of U.S. Provisional Patent Application No. 62/421,881, filed Nov. 11, 2016 and entitled "EWNEYE—SYSTEM AND METHOD ENABLING LOCATION, IDENTIFICATION, AUTHENTICATION AND RANGING FOR SMARTPHONE OR SMART CAMERA WITH SOCIAL NETWORKING FEATURES," the contents of which are incorporated by reference in their entirety as if fully set forth herein. This application also claims priority to and the benefit of U.S. Provisional Patent Application No. 62/574,517, filed Oct. 19, 2017 and entitled "PERSONAL AUGMENTED REALITY," the contents of which are incorporated by reference in their entirety as if fully set forth herein

FIELD OF THE INVENTION

The present invention is related to the field of electronic communications, location and authentication, and more specifically to systems and methods for electronic communications, location and authentication using smartphone cameras and the like.

BACKGROUND OF THE INVENTION

Establishing communications, obtaining location information, and performing authentication processes have exceedingly commonplace via the use of smartphones, but also exceedingly difficult. In particular, one of the difficulties of smartphones and related technologies is that individual separated by distances cannot effectively communicate relative location to each other. Further, such tasks are dependent on communications networks being active and operable.

For example, if a friend is attending the same sports event and communication and their location information is needed locate them, the first impulse would be to call or message them via a cell phone and have them identify what section, row and seat that they are in. However, section, row, and seat information may not be available at some events. Alternatively, one might arrange to meet them at a concession stand. However, if may be difficult to determine a stand that both parties can readily identify.

The foregoing example assumes some network connectivity for communications. However, in certain circumstances, network connectivity may be limited or even nonexistent. For example, the structure of a building may prevent mobile network signals from reaching a cell phone. Alternatively, one could be in a wilderness area or off-shore—away from cellular service for one or both parties. In such cases, individuals might in be relatively close proximity to each other, but may have no effective way to communicate (other than shouting for each other).

In view of the foregoing, there is a need for a method for more effective communication between individuals, especially in the absence of communications networks.

SUMMARY

Embodiments of the invention concern systems and methods for communications devices. In a first embodiment of the invention, there is provided a method in a communications device having a processor, a user interface, at least one light source, and an optical sensor array. The method includes receiving, at the processor, image data from the optical sensor array and detecting, via the processor, a first dot in the image data having a first strobe pattern. The method also includes demodulating, via the processor, the first strobe pattern to extract at least first identifying information for a first device associated with the first dot.

The method can further include detecting, via the processor, a second dot in the image data associated with the first dot, estimating, via the processor, a distance to the first and second dot displaying, via the user interface, the distance.

The method can further include generating, via the processor, a second strobe pattern representing an encoding of a message for the first device and activating the at least one light source according to the second strobe pattern. The message can include the first identifying information and the second identifying information.

The method can further include authenticating, via the processor, the first identifying information to yield an authentication result and displaying, via the user interface, the authentication result. The method can also include displaying, via the user interface, at least the first identifying information.

In a second embodiment, there is provided method in a communications device having a processor, a user interface, at least one light source, and an optical sensor array. The method includes receiving, at the processor, image data from the optical sensor array and detecting, via the processor, a plurality of dots in the image data having a strobe pattern. The method also includes demodulating, via the processor, the strobe pattern for each of the plurality dots to extract a plurality of corresponding messages and displaying, via the user interface, at least one of the plurality of corresponding messages.

Other embodiments of the invention concern communications devices having a processor, a user interface, at least one light source, and an optical sensor array. Such devices also include a memory storing instructions for causing the processor to perform the steps of the methods of the first and second embodiments.

BRIEF DESCRIPTION OF THE DRAWINGS

FIGS. 10A and 10B show an exemplary computing device for implementing the various embodiment of the invention.

DETAILED DESCRIPTION

Figure 1:
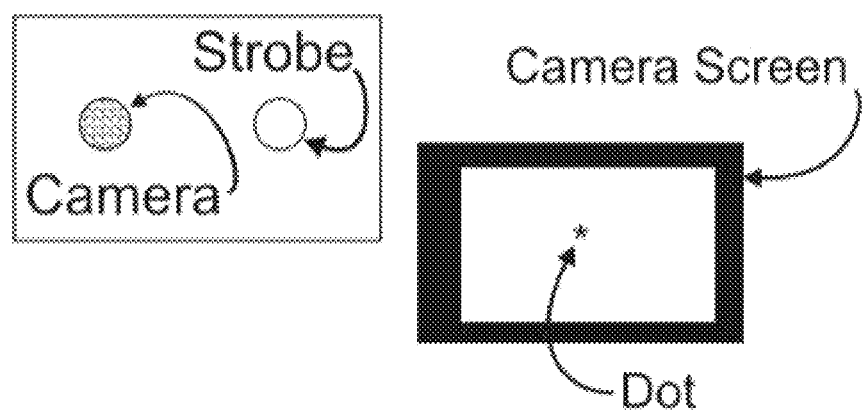
FIG. 1 shows the basic hardware elements of a smartphone.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Referring initially to FIG. 1, front (right) and rear (left) views of a typical smartphone are shown. The smartphone contains a camera and a strobe flash (typically a bright LED). The smartphone also has a screen to present images captured via camera 102. For example, a light seen by the camera would create a dot on the screen. Notice that these same elements are present in a digital camera.

Although the various exemplary embodiments will be described primarily with respect to smartphones, the various embodiments are not limited in this regard. Rather, the methods described here can be implemented using an other types of devices with integrated cameras and light sources that can be pulsed and/or modulated. For example, the same methods can be implemented using portable or laptop computers, tablet devices, or any other type of computing device with camera and/or illumination capabilities.

As technology for smartphones and digital cameras has advanced, newer models of each have included superior optics, in the form of a zoom lens and superior image sensors. As a result, such that a light from a greater distance, even with lower brilliance, can still be detected reliably. Alternatively, a lower level light can be detected with sufficient contrast in brighter surroundings at closer distances.

Figure 2:
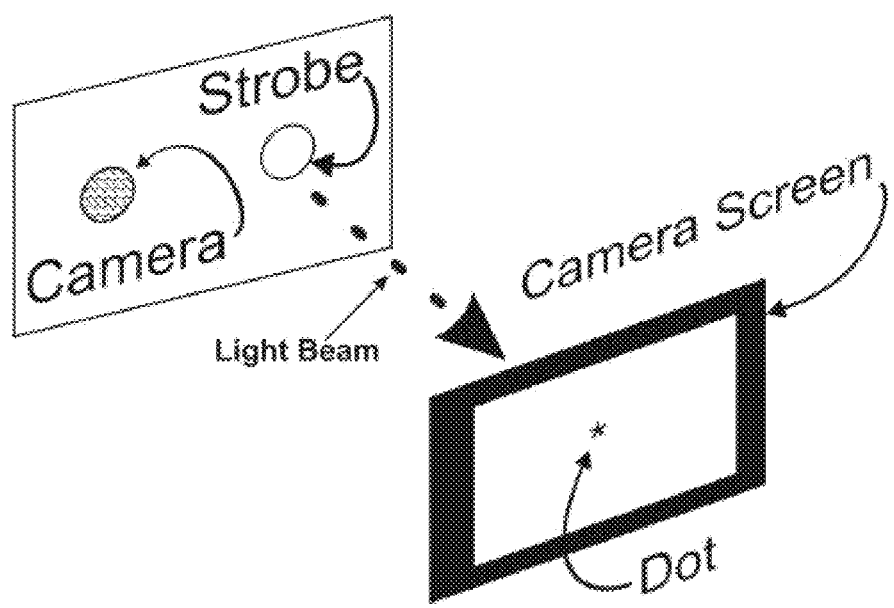
FIG. 2 shows optical transfer in accordance with an embodiment.

The various embodiments leverage these advances. For example, given two smartphones configured as in FIG. 1, the light produced a strobe flash at a first smartphone will typically visible by the camera of a second smartphone. When sufficiently separated, this will result in a dot on the screen of the second smartphone. This is illustrated in FIG. 2, with a first smartphone (left) creating a light beam (via its strobe flash) that is captured by a camera of the second smartphone (right) and a dot being generated on its screen. This capability is leveraged in the various embodiments to provide a non-network means of communications between smartphones and other similar camera comprising devices. In particular, since the operation of the strobe flash is highly controllable in smartphones and similar devices, the strobe flash can be operated in the various embodiments so as to convey information via a series of light pulses. However, to allow use of the strobe flash to reliably communicate information from one device to another, a supporting device must be able to reliability decipher such signals, even in the presence of multiple light sources.

Figure 3:
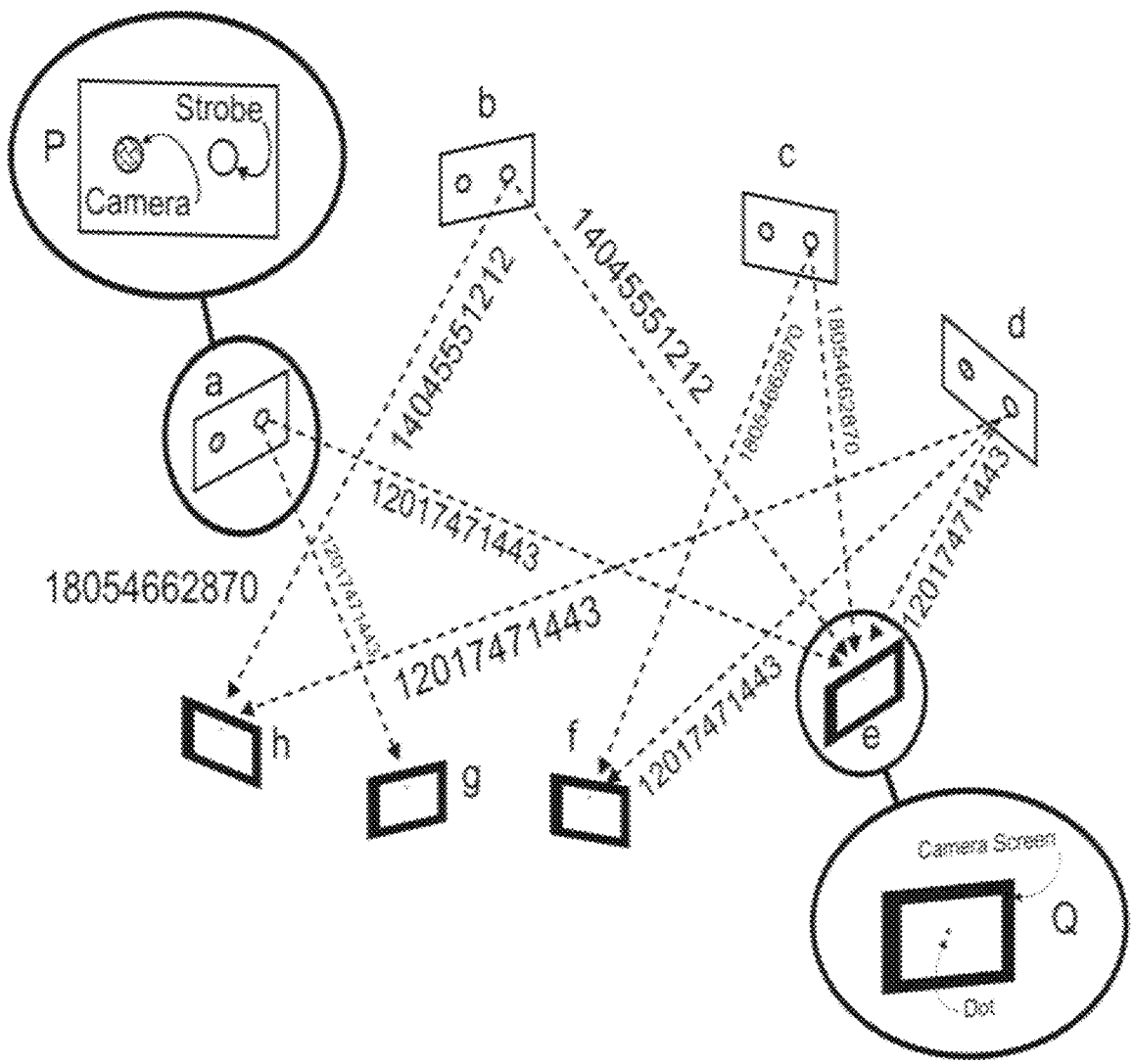
FIG. 3 shows optical transfer with a multiplicity of devices in accordance with an embodiment.

Therefore, one aspect of the various embodiments involves properly identifying which light source needs to be monitored or contains relevant information. In particular, the strobe flash can be operated so as to provide a string of pulses representing a unique identifier. In the case of a smartphone, this could be an associated telephone number or other identifier. In the case of a smart camera, the MAC address of its network adapter or other unique value. Thus, upon identifying a light source with an identifier of interest, all other light sources can be ignored and communication can proceed irrespective of the pulses being generated by other sources. For example, as shown in FIG. 3, a receiving smartphone (e) can receive light pulses from multiple transmitting smartphones (a, b, c, d). The light beam from each of the transmitting smartphone can be modulated so as to encode an associated identifier. The receiving smartphone can then select which of the light beams to read and which to ignore, based on the encoded identifier. Other receiving smartphones (h, g, f) in view of the transmitting smartphones can operate similarly.

In some instances, a user of the receiving smartphone may need to use a received light beam to locate a corresponding transmitting smartphone. Therefore, in some embodiments, when the light beam of a preselected source is detected, a receiving smartphone can be configured so that only the dot associated with that light beam needs to appear on the screen. The dot may be shown as against a monochromatic background, or be shown as a brighter or contracting color within a more general image as seen by the camera, or even integrated with an "augmented reality image. Location of the identifying dot, would of course, move appropriately as the camera is moved. In this manner, the remaining light beam can be used as a locating beacon of a specific individual in a crowd. In a similar fashion, a lighthouse, or other warning light could uniquely identify itself to those searching for it.

In certain embodiments, the hardware can be implemented to provide a non-visible frequency strobe, it could be much brighter than surroundings and provide higher contrast in daylight or illuminated areas.

For this simple scenario, no external connectivity is required as the identifying strobe modulation is based on preset values. It is presumed that the searching system would enter the identifying value into its application manually, or from an address or a contact list. This means can be adequate, where privacy is not an issue, or where identification of the parties does not need to authenticated and cell service not available.

In some embodiments, the functionality described above can provide visual beacons that emit an identifying stream from smartphones. In some cases, the visual beacons can be activated manually. However, in other cases, the visual beacons ay be activated automatically. For example, a smartphone can contain sensors that would detect shock, heat, or provide an emergency button to trigger broadcast of this beacon that would include the phone ID, sensor status and GPS location. The visual beacon can be repeated by monitoring systems and also provide probable cause for emergency personnel to enter a residence as would dialing 911. The screen could also locate alerts and/or messaging and guidance from the smartphones of emergency personnel or as emitted from broadcast LEDs in a building. This would work in situations where cell phone traffic is blocked or in disasters where cell service is lost or overloaded. In such cases, a simple application can be provided on cell phones could summon help, locate and guide individuals out of a catastrophe, or provide emergency peer communication between first responders. A single active phone could also bridge to WI-FI or Bluetooth, where the services are otherwise limited.

Because there is no dependence on cellular or other communications network connection, the communication means described herein is useful with retired cell phones that retain their processing capability, without any cellular connectivity. The retired cell phone could as well retain its optional WI-FI capabilities for networking and may have optional GPS location capabilities—the camera and flash capabilities are almost universal—even on the most primitive entry smartphone models.

With displays that refresh on NTSC standards (60 frames per second), and because the received light beam would appear as a dot on the CCD/CMOS imagining array, the data rate for an optical connection with phones of current design might be as high as 60 bits per second. If using non return to zero (NRZ) encoding and error detection, then the potential data rate is no better than half that rate without error correction by the Nyquist data sampling limit. This may be slow compared to other means, but the directional nature of the various embodiments makes it valuable as a locating or alerting device, especially in large areas or crowds where the network id information or phone number is unknown.

For example, using ascii encoding and parity, a 10-digit telephone number could be transmitted in 90 bytes or 1.5 seconds as characters, but only 32 bits or 0.53 seconds as a binary numeric value. This limitation could be removed if the receiving camera implements an alternate higher speed refresh rate when communicating in this fashion.

This implies that a telephone (or smart camera) might identify itself 112 times per minute. Following a response, if a BSSLAP or other 8-bit protocol Mobile Services Switching Center (MSC) or Base Station System (BSS) commands were added, this would become 1.66 seconds, and an IMEI (International Mobile Equipment Identity) 17-digit code that uniquely identifies Global System Mobile (GSM) phone devices, might add (9×17/60) or 2.55 seconds. Of course, not every transmission needs to carry this information—typically only the initial connection.

As a locating device, it could cry for help 112 times per minute, identify itself uniquely in 2.55 seconds and even broadcast its complete GPS location in about 1 minute. Potentially, Flash LEDs may be bright enough to be seen by a satellite with sophisticated sensitive imaging and such a system could have the function of the space based "Emergency Position-Indicating Radio Beacon" or EPIRB) that everyone would typically carry on their person by default. Simply point your phone (or smart camera) at the sky and press the help button. Such a satellite would be Emergency Warning Network's "EYE".

However, the various embodiments are not limited solely to emergency use. For example, in some cases, an impromptu network of optically connected devices might be established, where one device establishes itself as a DHCP server, with the remaining devices following a DHCP requesting protocol. A network, using traditional network protocols for communication could then interconnect between the members of a group of associated networked devices.

This means might thereby also be a mechanism for groups with a common affinity to recognize and locate other members of a similar group privately within a large group—or to connect with affinity groups to which they might aspire to membership.

For example, a cruise line establishes a guided tour of Aztec temples at night. All the members of the group may have phones that have no cellular connectivity, as they are in a foreign country, but can have an app enabling communications as described herein. Indeed, phones might be distributed by the tour organizers, to potential members of the group, to function as tickets to join the group. At the dock, the tour director assumes the role of the DHCP master and the smartphones of the participants can be the DHCP requesting devices. All the members of the group can then be identified with a simple network protocol command "ipconfig/all". This could be useful for keeping a group together in the dark, with participants otherwise unknown to each other, except by network ID; it could even work underwater, in a cave or a wilderness where cellular or satellite radio connectivity is impractical.

Further, if a member of the group of participants strays, their assigned IP address would no longer be in the tour guides ipconfig/all list, indicating the participant straying to the tour guide. Moreover, the straying member would be aware that they have strayed as well by loss of their IP address. However, they could reconnect with the group by locating the direction of the tour guide by panning the phone until a network ping is responded and received. The tour guide could also use the impromptu network to broadcast a narration of the tour that might be translated by intelligence in the phone, or preconfigured to be received by certain participants. It should be noted that the contrast of a flash LED in close proximity is so great that the function would work in daylight as well—the nighttime example is given as the participants might not be able to see each other otherwise.

Similarly, members of an arriving flight could all identify themselves to customs officials on arrival and be directed by network broadcast (language specific) messages, even the (preloaded) passport information could be communicated to the immigration officials by the optical connectivity of the various embodiments.

In another application, soldiers might establish impromptu (affinity group) battlefield organizations with encryption, coordinate operation of weapons and potentially identify friend from foe. Similarly, a cub scout group could stay together on a trip to the zoo. This would all be automatic under the control of an application on the phone(s) and outside the awareness of the affinity group members.

As technology advances, all of the functions of a smartphone will be condensed into a smaller space, potentially inside a wearable watch or pin, or even embedded as contact lenses and aural implants with camera and flash illumination provided by other wearable jewelry. The capability to form affinity groups for any purpose would then be almost endemic to all individuals.

As all cellphones are capable of 911 calls—a reverse 911 extension of that mechanism might broadcast an automated amber alert, or silver alert that would cause a specific (IMIE code) individual's phone to optically broadcast their ID information locally such that it could be detected. Similarly, a lost phone might be located in a large area, by calling the number as people often do now—but the flash might carry through bed covers, or if locked in a car, or out windows if locked in a building, by using another phone as an ID detector. And if a camera or cell phone were stolen, or inside a stolen vehicle, or in the possession of an endangered or dangerous individual—it might optically emit its ID information on network or reverse 911 cellular command.

Figure 4:
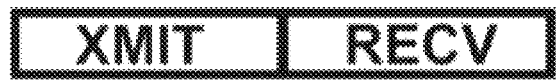
FIG. 4 shows operation with available connectivity in accordance with an embodiment.
Figure 5:
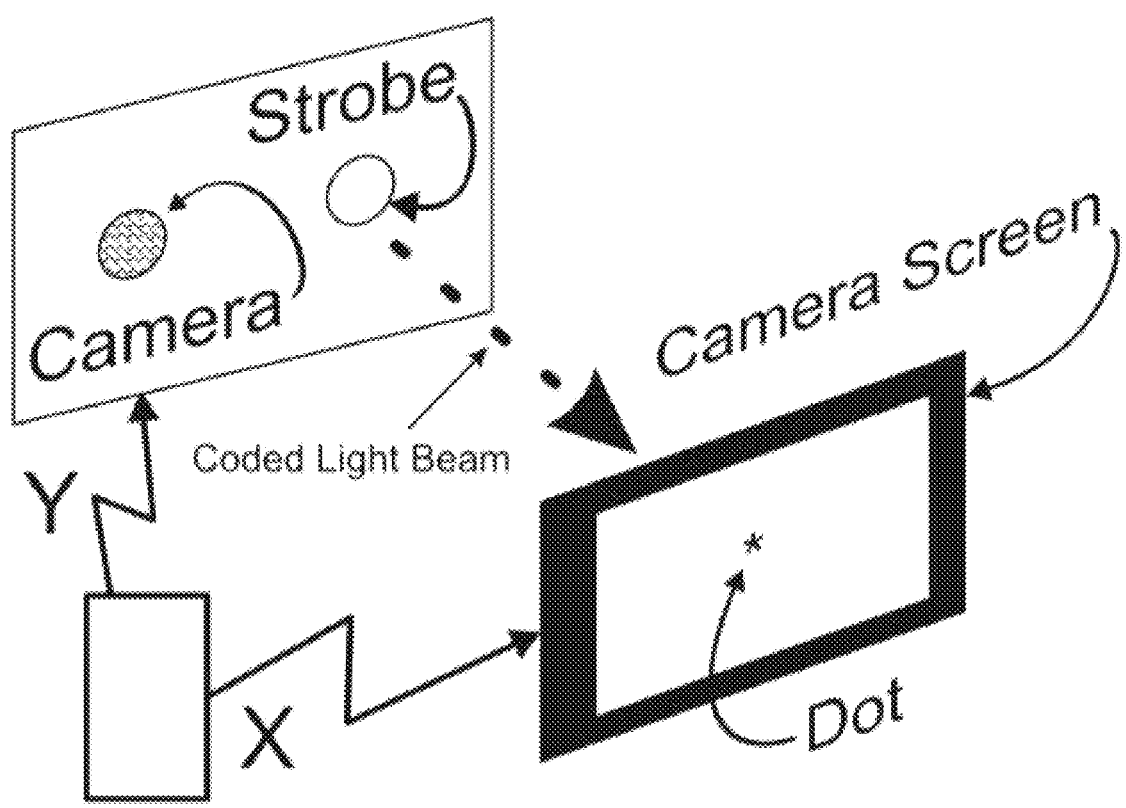
FIG. 5 shows a Pseudo ID identifying protocol in accordance with an embodiment.

If the identifying codes were set by connectivity initially, as in FIG. 4, they could be any value and indeed, each party could be looking for an authenticated value and broadcasting an authenticated value uniquely to the desired recipient(s). For example, as shown in FIG. 5, if two people, X and Y were to meet from a dating website, they could each be given a unique identifier to broadcast, which becomes a unique identifier to receive for the opposite party. The value does not have to be continuously available, only to be preset from a common server when each party has connectivity available. If a third party were involved for a formal introduction, they might be listening, looking for the specific broadcast values of each party.

Figure 6:
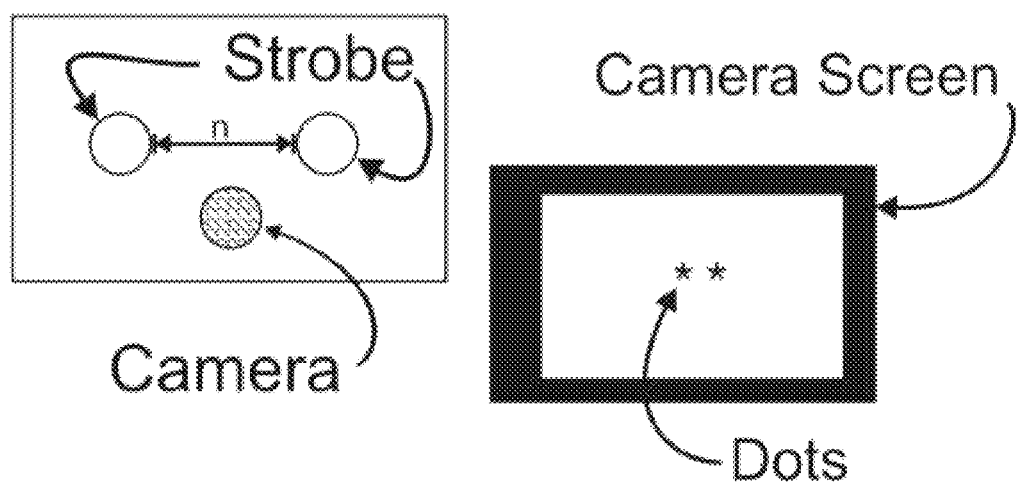
FIG. 6 shows a means for ranging and bearing in accordance with an embodiment.

If a device were implemented with multiple strobes, including visible strobes, non-visible strobes, or any combinations thereof, then distance/range information for the device can be discerned. For example, a distance between two strobes can be received and some estimate of range could be determined via triangulation methods, albeit variable with the angle of emission, or incidence to the cameras. This is schematically illustrated in FIG. 6. That is, using known distances between dots and an estimate of the angle between dots from the perspective of the receiving party. As there is no guarantee that the target is looking directly at the receiving party, several measurements over time can be performed and these different measurements can then be used to solve for the range. In some implementations, the receiving party could also monitor the dots over a period of time. Then, the receiving party could assume that that the widest perceived separation of dots corresponds to an arrangement in which target was looking directly at the receiver. Another means might be to move the transmitting device, side to side and the device sensing acceleration and time, would flash the strobe some standard distance apart.

Figure 7:
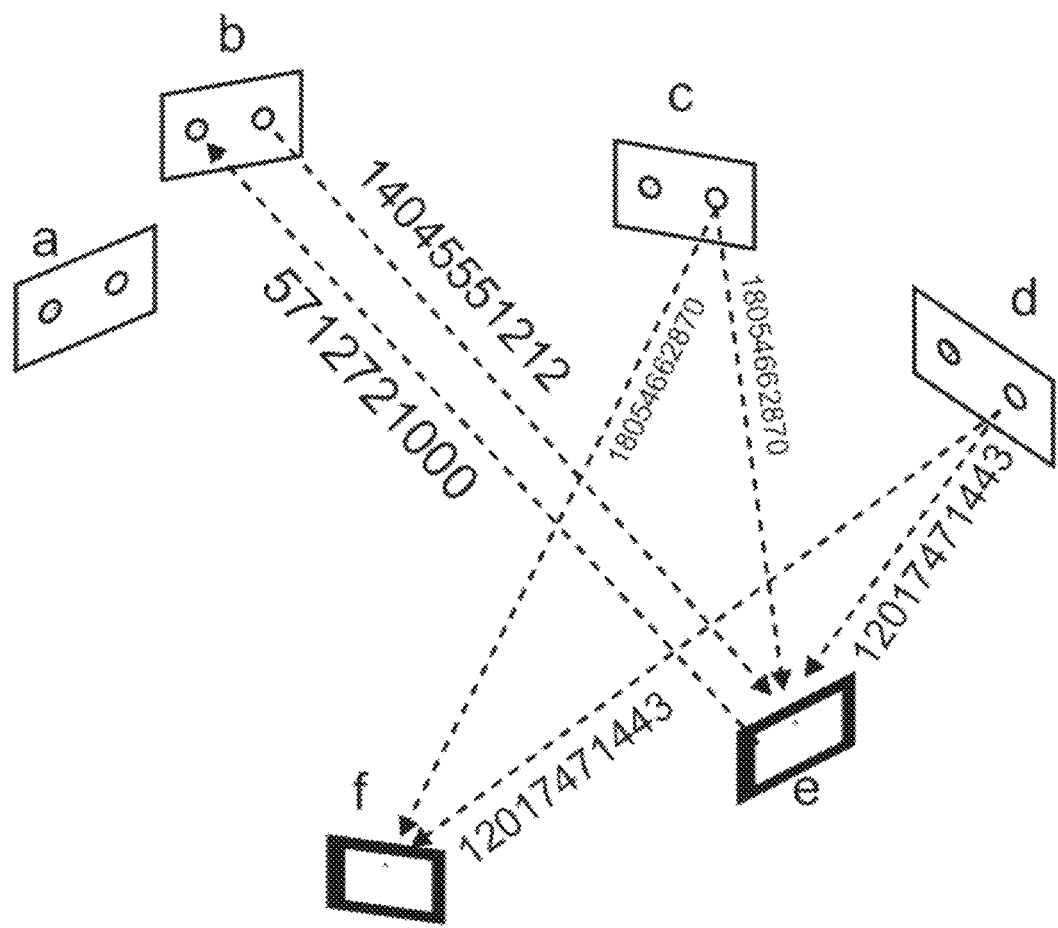
FIG. 7 shows authentication of unknown parties in accordance with an embodiment.

However, once a target is acquired, and identified by its unique number or value, as in FIG. 7, it can be discriminated for other nearby devices. Then (following acknowledgement), the strobe of a transmitting device could modulate text or even voice and full communication would be established between parties, without benefit of additional connectivity. This connection could be encrypted or in the clear. The light may be visible or non-visible to humans. Indeed, such line of sight communication could be more secure and selective than at broadcast radio frequencies. It would at least be an additional mode of communication for smartphone devices.

It is intended that this concept could be implemented with a simple application loadable to either smartphones or many digital cameras. By reference, there is a standard coding scheme for Canon brand cameras, where their functionality can be extended by higher level language commands called CHDK that utilize the very powerful visual image reduction processors in these cameras. There is a similar functionality for Nikon cameras, and one would assume also for other competitive brands.

The ability to use the onboard processing capability and extension software of existing WI-FI connected digital cameras would allow the camera, microphone, speaker display screen, strobe inherent in these cameras to provide much of the function of a smart cell phone. Further, they could communicate directly with smartphones and thereby even relay through the cellular and switched telephone networks. This could be of great use in extending the reach of such cameras and to assist in the integration of the cell phone and digital camera products into a single offering. Once a communication pseudo ID has been recognized, the receiving party would return a packet with Xmit and Recv IDs reversed, thereby acknowledging the connection. At this point text, voice or image communication over the light connection could begin. Image connection, would avoid the cellular connection and thus be significantly less expensive to implement and afford and bypass very high cellular data charges over the cellular network. Communication could become encrypted, perhaps with keys provided previously—where this is a means for location of parties within a social network, or affinity group within a social network.

Further, one or more parties can be broadcast sources to offer special services where initial connection between parties is authenticated by a third common party in a secure manner, and where communication proceeds in a secure manner afterward. There are obvious applications to intelligence, homeland security and the military for this capability.

Broadcasting of advertising, marketing, and/or general information is one potential use for this technology. For example, individuals providing antique coins, might broadcast a code associated with collectors of such coins (an affinity group) such that collectors would be attracted uniquely to the digitally encoded "sign". Think in terms of services offered in a closed community, such as a ship, or city. When, for example "Cherry Vanilla" ice cream is in surplus and offered at a sale price, cherry vanilla aficionados are attracted by category to the sale.

Unlike existing "beacons" technology, which simply transmit advertisements and information, the technology described herein allows for interactive advertising. Effective advertising offers content specifically tailored to specific customers—based on analysis—and distributed to them on request. With existing beacons technology, a WI-FI or Cellular data connection is required to allow the user's device to access a remote system to download and display advertisements, requiring an additional layer of complexity. In the present technology, the user device can obtain the same information without relying on an additional data link. Such a configuration has the added advantages that (1) the user is not required to pay for data usage and (2) interactive advertisements can be provided even in the absence of WI-FI or cellular data connections.

To be clear, this capability is accomplished by software applications running on cell phones, even without cell service availability and digital cameras and no hardware modification is required for the basic capabilities. The selection of the affinity group and interest can be pre-coded, loaded by secure connectivity, or manually entered by the user.

The technology described herein also provides new, inexpensive, and non-intrusive ways to provide advertising and marketing, as well as information of general interest to the public. For example, a single bright LED would replace a billboard sign. Thus, the billboard sign information would be instead provided in the form of broadcast messages, offers, text, images, traffic warnings, weather information, video and even control to vehicles. Thus potentially billboard signs can be removed. However, in some implementations, the technology can be used to complement existing billboard signs by providing a means to communicate updated information.

In some implementations, many LED sources could be placed together, each providing different information. The receiving party's device can then be configured to select what to receive by content or applicability. Additionally, the many LED sources could offer spatial diversity to focus energy in specific areas or directions by using, for example, coherent light sources or sources operating at different wavelengths.

Moreover, the present disclosure also contemplates that use of this technology is not limited to billboards or other traditional signage. Rather, any arrangement of light sources could potentially become a data source. For example, lights associated with holiday or decorative lighting can be configured to operate as data sources. In such cases, different lighting display could potentially be configured to operate cooperatively. For example, the data provided by multiple lighting displays could be coordinated to lead people to a destination.

Another potential application for this technology is secure identification/authentication. That is, the data transmission capabilities described herein can be used to support transmission of secure and/or encrypted information that can be used for reliable identification or authentication of users. For example, the information transmitted can contain information that will allow the receiving party to confirm the identity of a user. Thus, numerous military and security applications are possible. One potential application of this technology is an identifier system. That is, aircraft and other vehicles can be configured to use existing or additional lighting to transmit identification information for friend/foe identification. Similarly, lighting on automobiles can be configured to provide information to allow law enforcement to obtain numerous types of information about such vehicles. Another potential application is user identification/authentication. For example, a prescreened group identifier for TSA identification of secured frequent travelers can be transmitted, where the authorization identifiers are provided centrally by INS-DHS.

Still another potential application is for this technology is tagging and tracking. For example, children's clothing can incorporate an LED or other light source with a strobe pattern to generated an encoded beam. If parent and child become separated, the parent can scan the area with their smartphone to locate the child. In some cases, a location could include security cameras that can be activated upon request to provide image data for location the child. A similar approach can be utilized to tag and track pets, wildlife, patients, or any other persons, animals, or objects that could become misplaced.

As noted above, to the light sources need not be visible to the human eye. Thus, such light sources can be incorporated into clothing and other objects discreetly. For example, in the case of children's clothing, one or more buttons or other decorative features of the clothing can incorporate such light sources. Thus, in the case the child taken by a third party, the third party will be unaware of the tagging and tracking capabilities. A similar approach can be utilized to tag and track pets, wildlife, patients, or any other persons, animals, or objects that are improperly taken by third parties.

Similarly, one might use LED modulation of (all or part of) an automobile's lamps to (continuously or intermittently) emit a coded value, such that one might use a simple smartphone application to filter for a specific ID to locate one specific car in a crowded parking lot. This would work at a distance far greater, and with more precision, than the normal horn function on a smart-key fob. This would be especially valuable following a snowfall on a black Friday shopping event where every car has an identical appearance.

Figure 8:
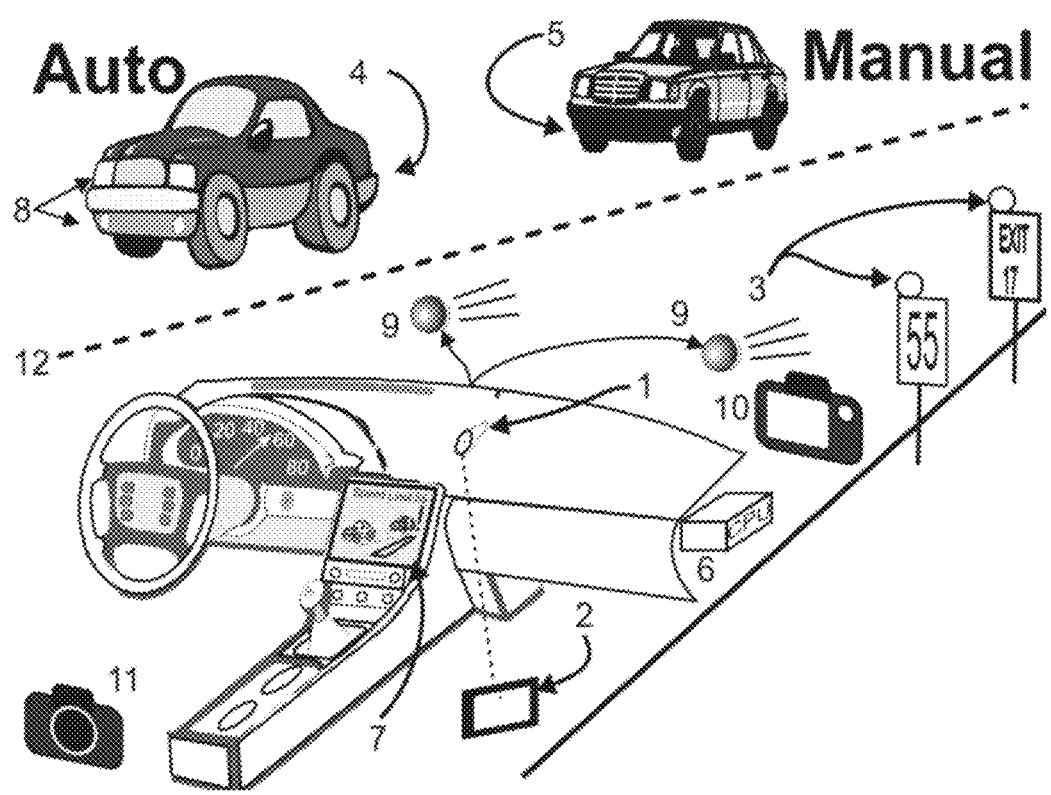
FIG. 8 shows creation of Situational Awareness in accordance with an embodiment.

Another embodiment provides an example of local optical communication by extension of the communication capabilities through a modern vehicle. Consider FIG. 8, the intelligent personal device (digital camera, telephone) (2) communicates through an internal transponder port inside a vehicle (1) and is repeated outward and receives information from nearby vehicles (4 and 5). In the most modern cars, there are LED parking, tail and headlights (9), which potentially can be modulated through the cars onboard machine intelligence (6). Further there are often outboard cameras facing fore (10) and aft (11) and potentially all about the exterior of the vehicle to produce peripheral imaging for the operator of the vehicle in a screen (7). These cameras can also route information from external sources back through the internal transponder port (1) to the intelligent personal device. These external sources may be other vehicles led lighting and cameras (8) or from road warning and directional signs (3) that provide useful information to the driver for management of the vehicle. The cars have sensation of their environment, including information that the operator cannot perceive, for example GPS positioning (12) of the roadway and its path, or the intention of other drivers.

Consider that some of the vehicles will be driverless with autonomous guidance (4), while co-existing with other vehicles (5) that are manually operated. The driverless cars will have a complete itinerary calculated, which can be shared with other similar vehicles for decision making, such as the equitable sharing of lanes, speed, following distance, lane changes between long distance travelers and those nearing a destination or routing change. Even the manually operated vehicle can join in with this conversation via a simple phone application utilizing external LED and camera devices. Thus there can be a community conversation between the vehicles, even informing other members of the group as to their GPS position or other Internet cloud information derived by any member of the group such as immanent weather information. There is effect a traveling "ground cloud" where locally pertinent information, or historically gathered information, such as traffic density experienced by other passing vehicles can be shared and repeated from vehicle to vehicle, potentially for miles—without need of continuous network connectivity. Indeed, if a vehicle or human operator has an anomaly; other vehicles can immediately accommodate rapid access to roadway, or emergency health services (e.g. direction to the nearest hospital for human emergencies). Indeed, such information might be routinely broadcast by signage along the way. Humans' health can be sensed by bodily instrumentation with smartphones such that emergency care can be alerted, requested and arranged; resources can be allocated and individuals routed to the most appropriate facility for a given malady.

What is envisioned is an integration of machine and human intelligence where a universe of information is created around the machine and humans through the continuous neighborhood interaction, conversation and exchange of information, without need for web connectivity. Web connectivity can be shared to universe participants within the "ground cloud". Humans may actually be unaware of the exchange between machines, only receiving exceptional information as required. The advantage is that by utilizing the components, already in the majority of vehicles, all members of the community are kept informed, even with partial or intermittent web connectivity. The group independently creates a collective situational awareness of the pertinent universe surrounding them. This situational awareness can then be relayed to the web, or other groups of participants through nearby communication, as vehicles' paths pass each other.

One additional embodiment is the modulation of tail and brake lights to indicate a first vehicle's mass, velocity, braking efficiency, following distance to objects ahead of it, and perhaps even the driver's reaction time between that first vehicle and those forward objects in a sudden braking situation. With this information a second vehicle following could calculate whether the first vehicle is likely to collide with objects in front of the first vehicle. Such collision would materially contribute to a more rapid deceleration of the first vehicle and potentially create a chain reaction accident, where the second vehicle's normally appropriate following distance would be inadequate to avoid a collision with the first vehicle. When, the second vehicle is notified of the potential of a collision of the first vehicle with objects in front of the first vehicle, the second vehicle would increase its following distance accordingly. Even a last minute warning to following vehicles would be valuable to increase braking force and reduce the severity of an unavoidable collision.

Said a different way: if a car detects that the car that it is following is tailgating then automatic braking would do what a prudent driver would do: back off some additional distance in order to avoid a potential chain reaction collision. This is especially valuable in roadway situations where some vehicles are piloted by incompetent, inebriated, or aggressive drivers.

Optical communication is proposed as it is low cost and can travel over reasonable distances and be identified uniquely by direction (and information headers). However, the concept of situational awareness diffusing information through migratory "ground clouds" is also practical with other forms of local communication, such as point to point radio, or microcells defined along the pathway.

In addition to the foregoing application, the various embodiments can also be useful for improving photography. For example, when recording video events at a great distance through a telescopic lens, various instabilities can cause apparent vibration or shaking of the remote scene. Normal image stabilization would be inadequate to remove the instability if it arises from atmospheric, seismic effects, spontaneous movement of objects in the scene—or from similar effects normally undetectable at the camera. However, if the objects to be recorded in the video are outfitted with a modulated LED emitting device, designating the specific object, then specific image detection circuitry in the camera could adjust the image at the sensor to be stable with reference to a single pel in the image detector. Similarly, a spot could be projected by a laser located at the camera toward a reflector affixed to the recorded object to remove atmospheric or seismic instabilities.

Similarly, in the production of digital motion pictures, for the purposes of continuity, it is desirable to record components of a scene from the exact same perspective, even when they are recorded at different times. Exact perspective is especially difficult to reproduce when equipment is taken down and reconstructed later. If objects in a scene are identified uniquely by unique modulation of (attached) LEDs, and associated with specific pels on the image sensor at a specific distance, the camera can automatically adjust it's (zoom) lens to place those key objects accurately within the scene—or indicate which items have been added, missing or moved. Specifically, if a LED associates the center of the camera field, with a specific pel, and additional LEDs associate specific pels, with the edges of a specific camera field in a scene, the orientation of the camera to the scene can be precisely determined. If the camera is misaligned to the scene, either the center or edge pels will be detectable and appropriate calculation can properly relocate the camera perspective to the scene. Further, other cameras that observe all the production equipment outside of the scene, can by using a similar, uniquely coded, modulated LED process, relocate lighting, microphones and various special effects devices (such as a fan) precisely, such that the entire procedure can be reconstructed accurately at a later time.

Figure 9:
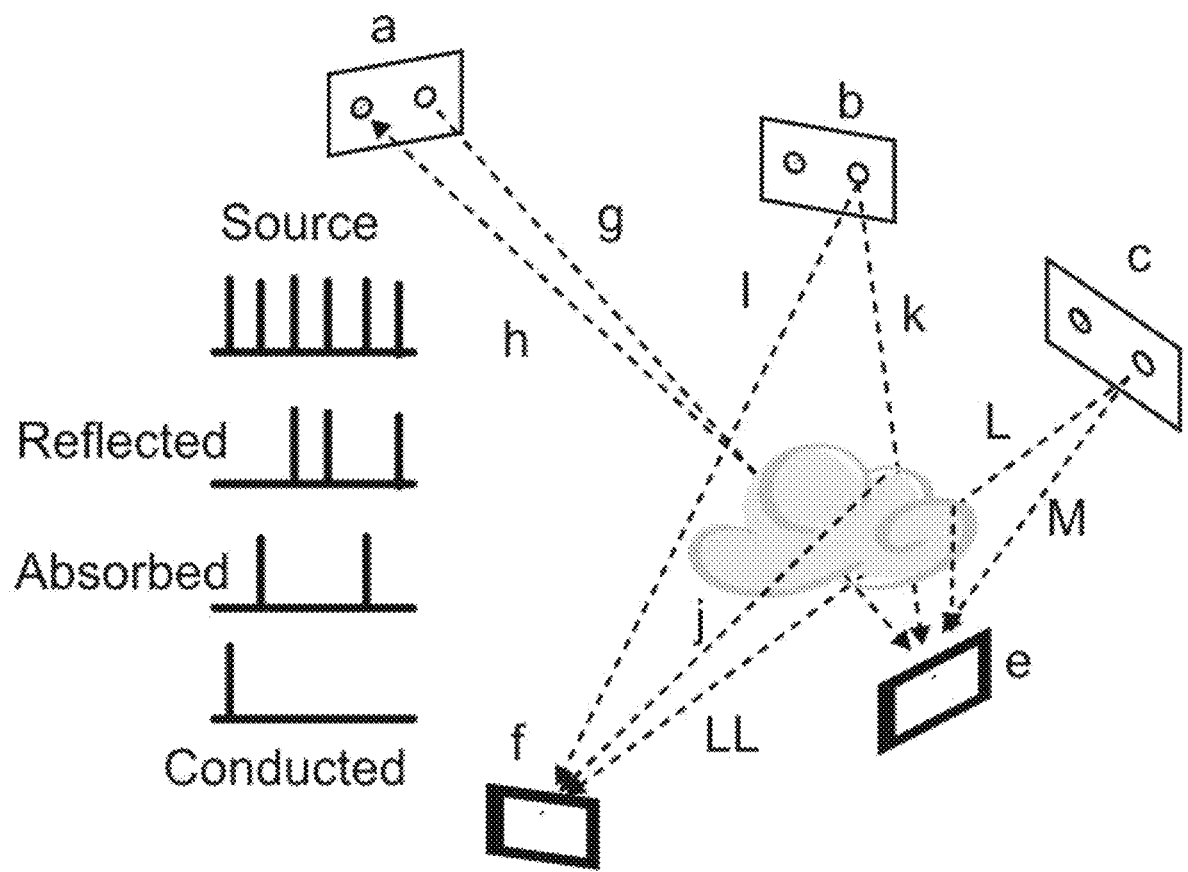
FIG. 9 shows an alternate embodiment for detecting gases.

When components of the light beams pass through a gas or liquid, different colors, at specific spectral frequencies are reflected, absorbed or conducted. This is shown in FIG. 9. In FIG. 9, source receiver pair (a) are detecting reflected spectral lines with incident beam (g) and reflected beam (h). Source (b) provides a reference beam (i) and incident beam (k) and refracted beam (j). A portion of (k) is absorbed and received at (e). Similarly, source (c) with different spectral lines in its source provides reference beam (M) and refracted (conducted) path (L). A portion of (L) has some lines absorbed into beam (LL) and is detected by (f). A combination of the reflected, absorbed and conducted spectral lines can identify the gas, liquid or solid in a "cloud"

FIGS. 10A, and 10B illustrate exemplary possible system configurations. The more appropriate configuration will be apparent to those of ordinary skill in the art when practicing the present technology. Persons of ordinary skill in the art will also readily appreciate that other system configurations are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a camera for still and video images, a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some configurations the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method performed by a communications device having a processor, a user interface, at least one light source, a memory module, and an optical sensor array, the method comprising:
    searching for one or more light pulses emitted by a plurality of devices, the one or more light pulses being associated with a strobe pattern;
    based at least in part on the searching, detecting, via the optical sensor array, a first set of light pulses associated with a first device of the plurality of devices and a second set of light pulses associated with a second device of the plurality of devices;
    determining, via the processor, a first portion of the first set of light pulses, the first portion of the first set of light pulses being associated with a first light source of the first device;
    demodulating, via the processor, the first portion of the first set of light pulses to extract a first string of light pulses representing a unique identifier for the first device;
    retrieving identification data from the memory module;
    based at least in part on the retrieved identification data and the extracted first string of light pulses, determining that the unique identifier for the first device is an identifier of interest;
    filtering out the second set of light pulses associated with the second device;
    further demodulating, via the processor, the first portion of the first set of light pulses to extract a second string of light pulses representing a first message;
    determining a reply message for the first device based on the demodulated first message;
    generating, via the processor and based on the determined reply message for the first device, a third string of light pulses representing an encoding of the reply message for the first device; and
    activating the at least one light source to emit the third string of light pulses.

2. The method of claim 1, further comprising:
    determining, via the processor, a second portion of the first set of light pulses, the second portion of the first set of light pulses being associated with a second light source of the first device;
    estimating, via the processor, a distance from the first light source of the first device to the second light source of the first device; and
    displaying, via the user interface, the distance.

3. The method of claim 1, wherein the first message includes the unique identifier for the first device.

4. The method of claim 1, wherein the first message includes identifying information associated with the communications device.

5. The method of claim 1, further comprising displaying, via the user interface, at least the unique identifier for the first device.

6. The method of claim 1, wherein the unique identifier is associated with a telephone number.

7. The method of claim 1, wherein the unique identifier is associated with a MAC address.

8. The method of claim 1, wherein the first message includes passport information associated with a user of the first device.

9. The method of claim 1, wherein the first message includes a location of the first device.

10. A communications device comprising:
    a processor;
    a user interface communicatively coupled to the processor;
    at least one light source communicatively coupled to the processor, wherein the at least one light source is configured to emit light pulses;
    an optical sensor array communicatively coupled to the processor, wherein the optical sensor array is configured to detect light pulses; and
    a memory module storing instructions to cause the processor to:
        search for one or more light pulses emitted by a first device, the one or more light pulses being associated with a strobe pattern;
        based at least in part on the searching, detect, via the optical sensor array, a first set of light pulses associated with the first device;
        determine a first portion of the first set of light pulses, the first portion of the first set of light pulses being associated with a first light source of the first device;
        demodulate the first portion of the first set of light pulses to extract a first string of light pulses representing a unique identifier for the first device;
        retrieve identification data from the memory module;
        based at least in part on the retrieved identification data and the extracted first string of light pulses, determine that the unique identifier for the first device is an identifier of interest;
        further demodulate the first portion of the first set of light pulses to extract a second string of light pulses representing a first message;
        determine a reply message for the first device based on the demodulated first message;
        generate a third string of light pulses representing an encoding of the reply message for the first device; and
        activate the at least one light source to emit the second string of light pulses.

11. The communications device of claim 10, wherein the processor is further configured to:
    determine a second portion of the first set of light pulses, the second portion of the first set of light pulses being associated with a second light source of the first device; and estimate a distance from the first light source of the first device to the second light source of the first device.

12. The communications device of claim 10, wherein the first message includes the unique identifier for the first device.

13. The communications device of claim 10, wherein the first message includes identifying information associated with the communications device.

14. The communications device of claim 10, wherein the processor is further configured to:
   authenticate the unique identifier for the first device to yield an authentication result; and
   activate the user interface to display the authentication result.

15. The communications device of claim 10, wherein the processor is further configured to:
   activate the user interface to display at least the unique identifier for the first device.

16. A first device comprising:
   a processor;
   a plurality of light sources communicatively coupled to the processor and configured to emit light pulses; and
   a memory storing encoding data, and instructions to cause the processor to:
      generate one or more light pulses associated with a strobe pattern, the strobe pattern being searchable by a communications device;
      identify one or more messages for transmission via the plurality of light sources;
      generate a first string of a first set of light pulses representing an encoding of a unique identifier for the first device;
      generate a subsequent string of the first set of light pulses representing an encoding of each of the one or more messages;
      associate each of the one or more messages with a light source of the plurality of light sources; and
      activate each light source of the plurality of light sources based on either the unique identifier or the associated one or more messages.

17. The first device of claim 16, wherein a first subset of the plurality of light sources are spatially diverse.

18. The first device of claim 16, further comprising at least one optical array communicatively coupled to the processor and configured to detect light pulses, wherein the memory is further configured to store instructions to cause the processor to:
   detect, via the at least one optical array, a second set of light pulses associated with a second device;
   determine a first portion of the second set of light pulses, the first portion of the second set of light pulses being associated with a first light source of the second device; and
   demodulating the first portion of the second set of light pulses to extract (i) a first string of the first portion of the second set of light pulses representing an encoding of a unique identifier for the second device, and (ii) a subsequent string of the first portion of the second set of light pulses representing a response to the one or more messages.

19. The first device of claim 16, wherein at least a portion of the plurality of light sources of the first device is associated with different wavelengths.

20. The first device of claim 19, wherein the different wavelengths comprise visible wavelengths, non-visible wavelengths, or a combination thereof.

* * * * *